US012802177B2

(12) United States Patent
Kim

(10) Patent No.: US 12,802,177 B2
(45) Date of Patent: Nov. 17, 2026

(54) IMAGE SIGNAL PROCESSOR AND METHOD FOR PROCESSING IMAGE SIGNAL

(71) Applicant: SK hynix Inc., Icheon-si (KR)

(72) Inventor: Jin Su Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 305 days.

(21) Appl. No.: 18/409,485

(22) Filed: Jan. 10, 2024

(65) Prior Publication Data

US 2024/0273685 A1 Aug. 15, 2024

(30) Foreign Application Priority Data

Feb. 13, 2023 (KR) ........................ 10-2023-0018763

(51) Int. Cl.

| | |
|---|---|
| ***G06T 5/70*** | (2024.01) |
| ***G06T 3/4015*** | (2024.01) |
| ***G06T 5/20*** | (2006.01) |

(52) U.S. Cl.

CPC .............. *G06T 5/70* (2024.01); *G06T 3/4015* (2013.01); *G06T 5/20* (2013.01); *G06T 2207/10024* (2013.01); *G06T 2207/20032* (2013.01)

(58) Field of Classification Search

CPC ......... G06T 3/4015; G06T 2207/10024; G06T 5/70; G06T 2207/20032; G06T 5/20; G06T 7/90; H04N 23/843; H04N 23/83; H04N 23/88; H04N 23/86

See application file for complete search history.

(56) References Cited

U.S. PATENT DOCUMENTS

2019/0230253 A1 7/2019 Nikhara et al.
2020/0228769 A1 * 7/2020 Yu .......................... H04N 23/71

FOREIGN PATENT DOCUMENTS

JP 5810593 B2 11/2015

OTHER PUBLICATIONS

S. Satpathy, M. C. Pradhan and S. Sharma, "Comparative Study of Noise Removal Algorithms for Denoising Medical Image Using LabVIEW," 2015 International Conference on Computational Intelligence and Communication Networks (CICN), Jabalpur, India, 2015, pp. 300-305, doi: 10.1109/CICN.2015.67 (Year: 2015).*

* cited by examiner

*Primary Examiner* — Matthew C Bella
*Assistant Examiner* — Janice E. Vaz
(74) *Attorney, Agent, or Firm* — WILLIAM PARK AND ASSOCIATES LTD.

(57) ABSTRACT

An image signal processor and an image signal processing method are disclosed. The image signal processor includes a local white balance gain (LWBG) calculator configured to calculate a first gain representing a ratio between red pixel data and green pixel data and a second gain representing a ratio between blue pixel data and green pixel data, a local white balance gain (LWBG) corrector configured to generate a first correction gain and a second correction gain by filtering each of the first gain and the second gain, and a demosaicing corrector configured to correct each of the red pixel data, the green pixel data, and the blue pixel data using the first correction gain and the second correction gain.

15 Claims, 9 Drawing Sheets

CIMG_G

| | | | | | |
|---|---|---|---|---|---|
| B11 * FBG11 | B12 * FBG12 | G13 | G14 | B15 * FBG15 | B16 * FBG16 |
| B21 * FBG21 | B22 * FBG22 | G23 | G24 | B25 * FBG25 | B26 * FBG26 |
| G31 | G32 | R33 * FRG33 | R34 * FRG34 | G35 | G36 |
| G41 | G42 | R43 * FRG43 | R44 * FRG44 | G45 | G46 |
| B51 * FBG51 | B52 * FBG52 | G53 | G54 | B55 * FBG55 | B56 * FBG56 |
| B61 * FBG61 | B62 * FBG62 | G63 | G64 | B65 * FBG65 | B66 * FBG66 |

FIG.8

IMAGE SIGNAL PROCESSOR AND METHOD FOR PROCESSING IMAGE SIGNAL

CROSS-REFERENCE TO RELATED APPLICATION

This patent document claims the priority and benefits of Korean patent application No. 10-2023-0018763, filed on Feb. 13, 2023, in the Korean Intellectual Property Office, the disclosure of which is incorporated herein by reference in its entirety as part of the disclosure of this patent document.

BACKGROUND

1. Technical Field

The technology and implementations disclosed in this patent document generally relate to an image signal processor capable of performing image conversion and, more particularly, to an image signal processing method using the image signal processor.

2. Related Art

An image sensing device is a device for capturing optical images by converting light into electrical signals using a photosensitive semiconductor material which reacts to light. With the development of automotive, medical, computer and communication industries, the demand for high-performance image sensing devices is increasing in various fields such as smart phones, digital cameras, game machines, IoT (Internet of Things), robots, security cameras and medical micro cameras.

In an original image captured by the image sensing device, pixels corresponding to different colors (e.g., red, blue, and green) are typically arranged according to a certain color pattern (e.g., Bayer pattern). In order to convert the original image into a complete image (e.g., RGB image), an operation for performing interpolation according to a predetermined algorithm is performed. Since this algorithm basically includes an operation of interpolating a pixel from which information is omitted using information of neighboring pixels, serious noise may occur in a specific image due to limitations of the algorithm.

SUMMARY

In accordance with an embodiment of the disclosed technology, an image signal processor may include a local white balance gain (LWBG) calculator configured to calculate a first gain representing a ratio between red pixel data and green pixel data and a second gain representing a ratio between blue pixel data and green pixel data; a local white balance gain (LWBG) corrector configured to generate a first correction gain and a second correction gain by filtering each of the first gain and the second gain; and a demosaicing corrector configured to correct each of the red pixel data, the green pixel data, and the blue pixel data using the first correction gain and the second correction gain.

In accordance with another embodiment of the disclosed technology, an image signal processing method may include: calculating a first gain representing a ratio between red pixel data and green pixel data and a second gain representing a ratio between blue pixel data and green pixel data; generating a first correction gain and a second correction gain by filtering each of the first gain and the second gain; and correcting each of the red pixel data, the green pixel data, and the blue pixel data using the first correction gain and the second correction gain.

BRIEF DESCRIPTION OF THE DRAWINGS

The above and other features and beneficial aspects of the disclosed technology will become readily apparent with reference to the following detailed description when considered in conjunction with the accompanying drawings.

FIGS. 7, 8, and 9 are schematic diagrams illustrating examples of operation S80 shown in FIG. 2 based on some implementations of the disclosed technology.

DETAILED DESCRIPTION

Figure 1:
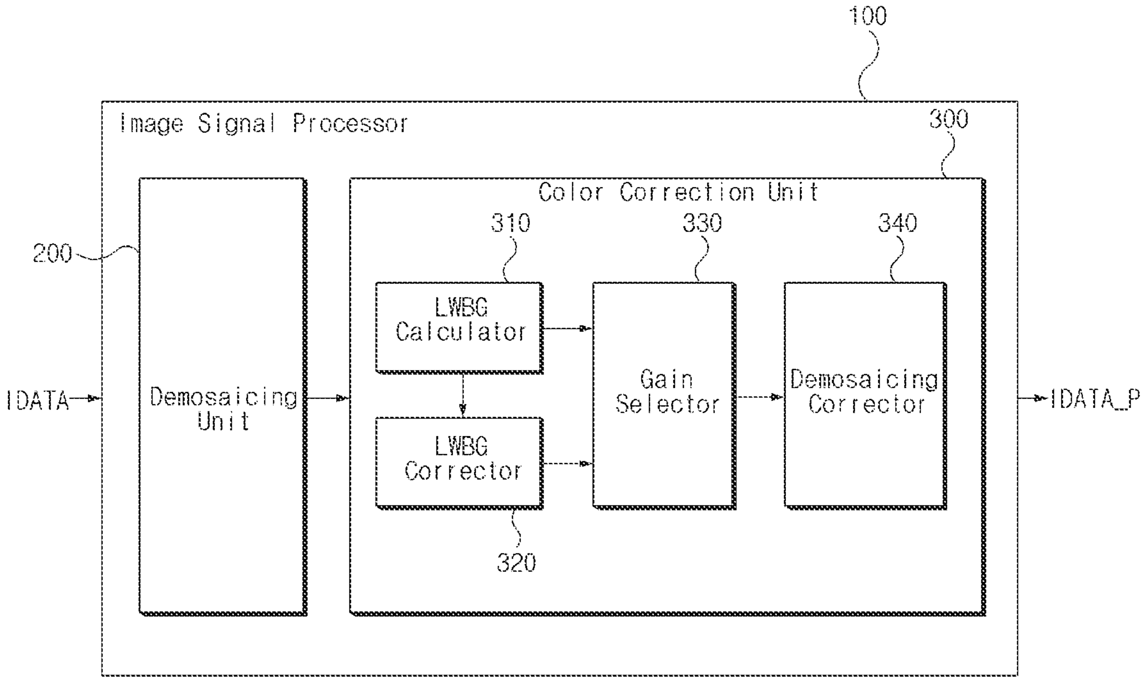
FIG. 1 is a block diagram illustrating an example of an image signal processor based on some implementations of the disclosed technology.

This patent document provides embodiments and examples of an image signal processor capable of performing image conversion that may be used in configurations to substantially address one or more technical or engineering issues and to mitigate limitations or disadvantages encountered in some other image signal processors. Some embodiments of the disclosed technology relate to an image signal processor capable of increasing the accuracy of demosaicing, and an image signal processing method for the same. The disclosed technology provides various embodiments of an image signal processor that can reduce demosaicing errors for an image including a locally bright object.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Various embodiments of the disclosed technology relate to an image signal processor capable of increasing the accuracy of demosaicing, and an image signal processing method using the same.

It is to be understood that both the foregoing general description and the following detailed description of the disclosed technology are illustrative and explanatory and are intended to provide further explanation of the disclosure as claimed.

FIG. 1 is a block diagram illustrating an example of an image signal processor 100 based on some implementations of the disclosed technology.

Referring to FIG. 1, the image signal processor (ISP) 100 may perform at least one image signal process on image data (IDATA) to generate the processed image data (IDATA_P).

The image signal processor (ISP) 100, in an embodiment, may reduce noise of image data (IDATA), and may perform various kinds of image signal processing (e.g., demosaicing, defect pixel correction, gamma correction, color filter array interpolation, color matrix, color correction, color enhancement, lens distortion correction, etc.) for image-quality improvement of the image data. In various embodiments, the ISP 100 may compress image data that has been created by execution of image signal processing for image-quality improvement, such that the ISP 100 can create an image file using the compressed image data. Alternatively, the ISP 100 may recover image data from the image file. In this case, the scheme for compressing such image data may be a reversible format or an irreversible format. As a representative example of such compression format, in the case of using a still image, Joint Photographic Experts Group (JPEG) format, JPEG 2000 format, or the like can be used. In addition, in the case of using moving images, a plurality of frames can be compressed according to Moving Picture Experts Group (MPEG) standards such that moving image files can be created.

The image data (IDATA) may be generated by an image sensing device that captures an optical image of a scene, but the scope of the disclosed technology is not limited thereto. The image sensing device may include a pixel array including a plurality of pixels configured to sense incident light received from a scene, a control circuit configured to control the pixel array, and a readout circuit configured to output digital image data (IDATA) by converting an analog pixel signal received from the pixel array into the digital image data (IDATA). In some implementations of the disclosed technology, it is assumed that the image data (IDATA) is generated by the image sensing device.

The pixel array may include a color filter array (CFA) in which color filters are arranged according to a predetermined pattern (e.g., a Bayer pattern, a quad-Bayer pattern, nona-Bayer pattern, an RGBW pattern, etc.) so that each color filter can sense light of a predetermined wavelength band. The pattern of the image data (IDATA) may be determined according to the type of the pattern of the CFA. The word "predetermined" as used herein with respect to a parameter, such as a predetermined pattern, threshold, size, distance, condition, algorithm, and wavelength band, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm. The ISP 100 may be a computing device mounted on a chip independent of a chip on which the image sensing device is mounted. The chip on which the image sensing device is mounted and the chip on which the ISP 100 is mounted may communicate with each other through a predetermined interface. According to one embodiment, the chip on which the image sensing device is mounted and the chip on which the ISP 100 is mounted may be implemented in one package, for example, a multi-chip package (MCP), but the scope of the present invention is not limited thereto. The chip on which the ISP 100 is mounted may include a memory device that the ISP 100 can access, and the memory device may store at least a portion of the image data IDATA. Also, the memory device may store instructions for executing components 200 and 300 of the ISP 100 implemented in hardware, software, or a combination thereof. Meanwhile, the ISP 100 may generate the processed image data IDATA_P by performing at least one image signal processing on the image data IDATA received from the image sensing device. The ISP 100 may store the processed image data IDATA_P in the memory device or output the processed image data IDATA_P to an external device (e.g., an application processor, a flash memory, a display, etc.).

The ISP 100 may include a demosaicing unit 200 and a color correction unit 300.

The demosaicing unit 200 may generate interpolated image data by interpolating original image data. The original image data may refer to image data (IDATA) or data obtained by pre-processing the image data (IDATA), and may correspond to a certain pattern (e.g., a Bayer pattern, a quad-Bayer pattern, a nona-Bayer pattern, an RGBW pattern, or the like). The original image data having such a certain pattern includes pixel data corresponding to only one color per pixel. However, in order to express a complete image for human eyes, pixel data corresponding to each of red, green, and blue may be required for each pixel. For example, original image data having a Bayer pattern may include data corresponding to red, green, or blue per pixel, and interpolation may refer to an operation of generating (or estimating) data corresponding to the remaining two colors for one pixel corresponding to red, green or blue. Here, pixel data may refer to image data corresponding to one pixel, and a set (or aggregate) of pixel data corresponding to one frame may constitute original image data.

A detailed description of such interpolation is as follows. Interpolation may be performed for each kernel having a predetermined size (e.g., 10×10). The interpolation may calculate a gradient between pixel data values of pixels having a homogeneous color (e.g., the same color) as target pixels arranged in specific directions (e.g., a horizontal direction, a vertical direction, and a diagonal direction) within a kernel in which the target pixels to be interpolated are disposed at the center, may detect an edge based on the calculated gradient, may determine a reference direction based on the detected edge, may calculate (e.g., linear interpolation) pixel data of pixels disposed in the determined reference direction, and may thus calculate pixel data corresponding to colors different from those of the target pixels.

In some implementations, the demosaicing unit 200 may generate RGB image data by interpolating original image data.

The color correction unit 300 may be configured to correct false colors present in interpolated image data. In particular, the color correction unit 300 may correct false colors that may occur when a bright object formed in a spot shape is present in a scene. In the following description, it is assumed that the interpolated image data is RGB data including red image data corresponding to a red color, green image data corresponding to a green color, and blue image data corresponding to a blue color.

The color correction unit 300 may include a local white balance gain (LWBG) calculator 310, a local white balance gain (LWBG) corrector 320, a gain selector 330, and a demosaicing corrector 340. Here, LWBG may mean a value obtained when a color ratio to be used for white balance adjustment is acquired for each pixel.

The LWBG calculator 310 may calculate a first LWBG representing a ratio between red pixel data and green pixel data for each pixel in RGB image data, and may calculate a second LWBG representing a ratio between blue pixel data and green pixel data for each pixel in RGB image data.

The LWBG corrector 320 may calculate each of the first correction local white balance gain (CLWBG) and the second CLWBG by performing smoothing-filtering on each of the first LWBG and the second LWBG. Here, the smoothing-filtering may refer to an operation for reducing a degree of rapid change of any one LWBG that rapidly changes compared to the surroundings from among the first LWBG and the second LWBG. For example, smoothing-filtering may refer to an operation for applying a filter to a kernel having a predetermined size. In the disclosed technology, the first CLWBG may also be referred to as a first correction gain, and the second CLWBG may also be referred to as a second correction gain.

The gain selector 330 may select a gain suitable for a target pixel from among LWBGs (i.e., the first LWBG and the second LWBG) and CLWBGs (i.e., the first CLWBG and the second CLWBG). The target pixel may refer to a pixel to be corrected by the color correction unit 300.

A gain suitable for the target pixel may vary depending on whether it is determined that a bright object formed in a spot shape exists in the target pixel. For example, when a bright object formed in a spot shape exists in the target pixel, selecting the CLWBG to which smoothing-filtering is applied may be helpful to reduce noise. Conversely, if the CLWBG to which smoothing-filtering is applied is selected in a situation where the bright object formed in a spot shape does not exist in the target pixel, chroma of the image may be more likely to be degraded, so that it may be more preferable to select the local white balance gain (LWBG).

The demosaicing corrector 340, in an embodiment, may correct RGB image data by applying a final gain (e.g., LWBG or CLWBG) determined for each pixel to the original image data. This correction by the demosaicing corrector 340, in an embodiment, may be required to selectively apply smoothing-filtering to a pixel in which the bright object formed in a spot shape exists, and may refer to an operation for effectively reducing false colors generated by interpolation of the demosaicing unit 200.

Figure 2:
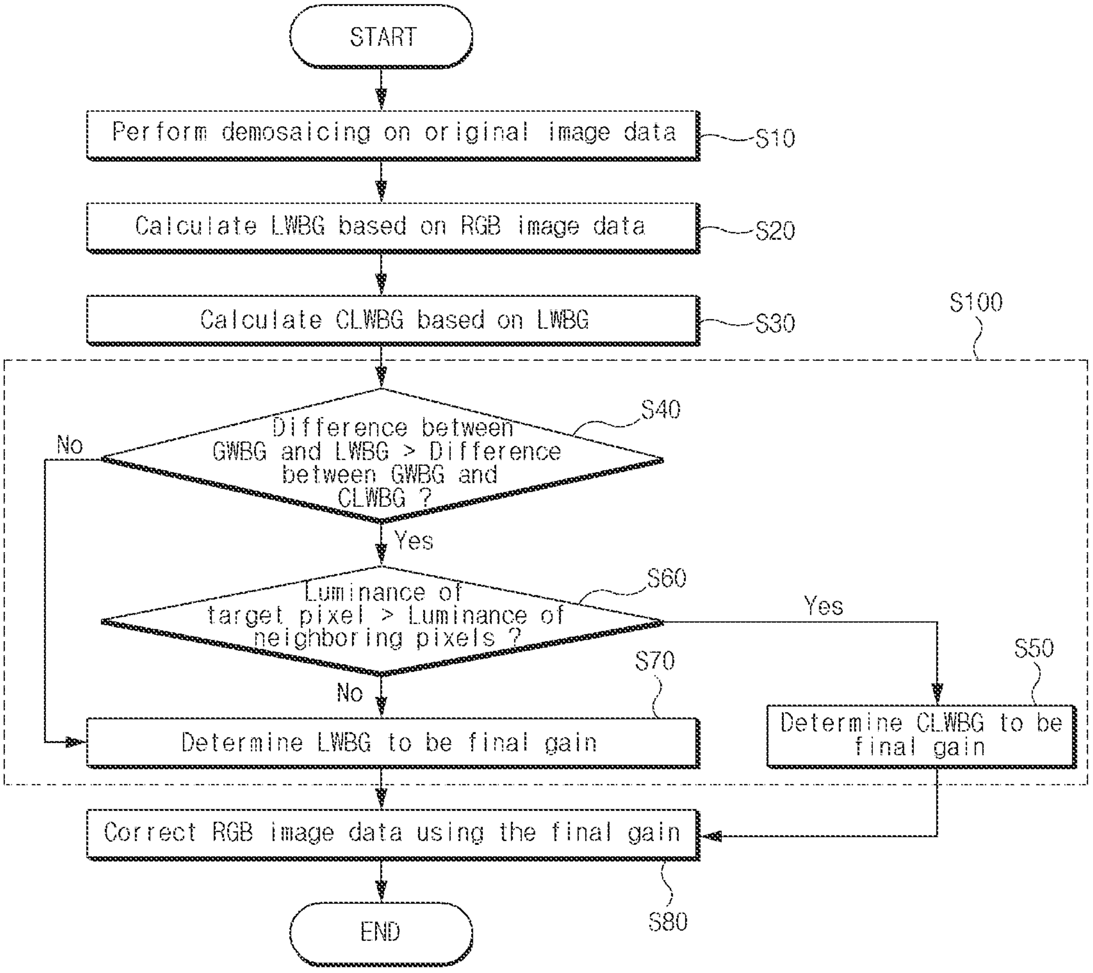
FIG. 2 is a flowchart illustrating an example of an image processing method based on some implementations of the disclosed technology.
Figure 3:
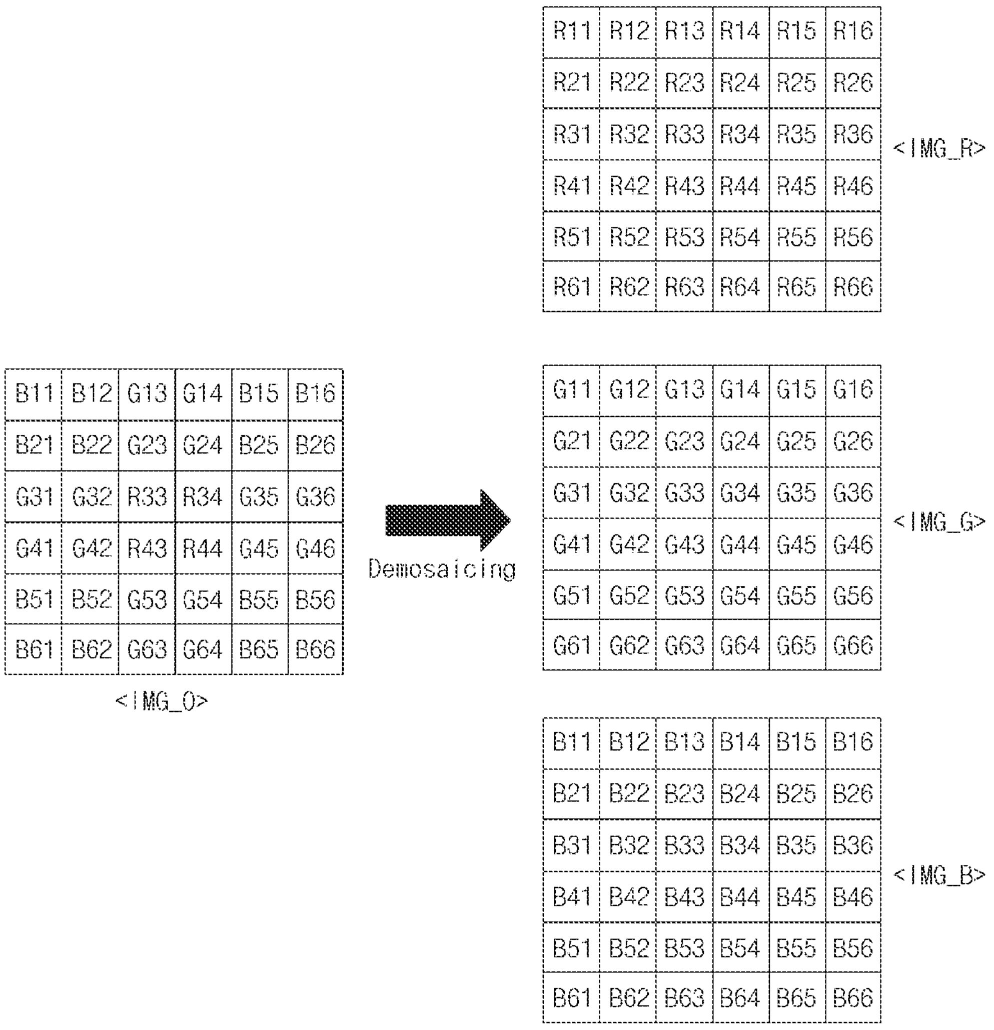
FIG. 3 is a schematic diagram illustrating an example of operation S10 shown in FIG. 2 based on some implementations of the disclosed technology.
Figure 4:
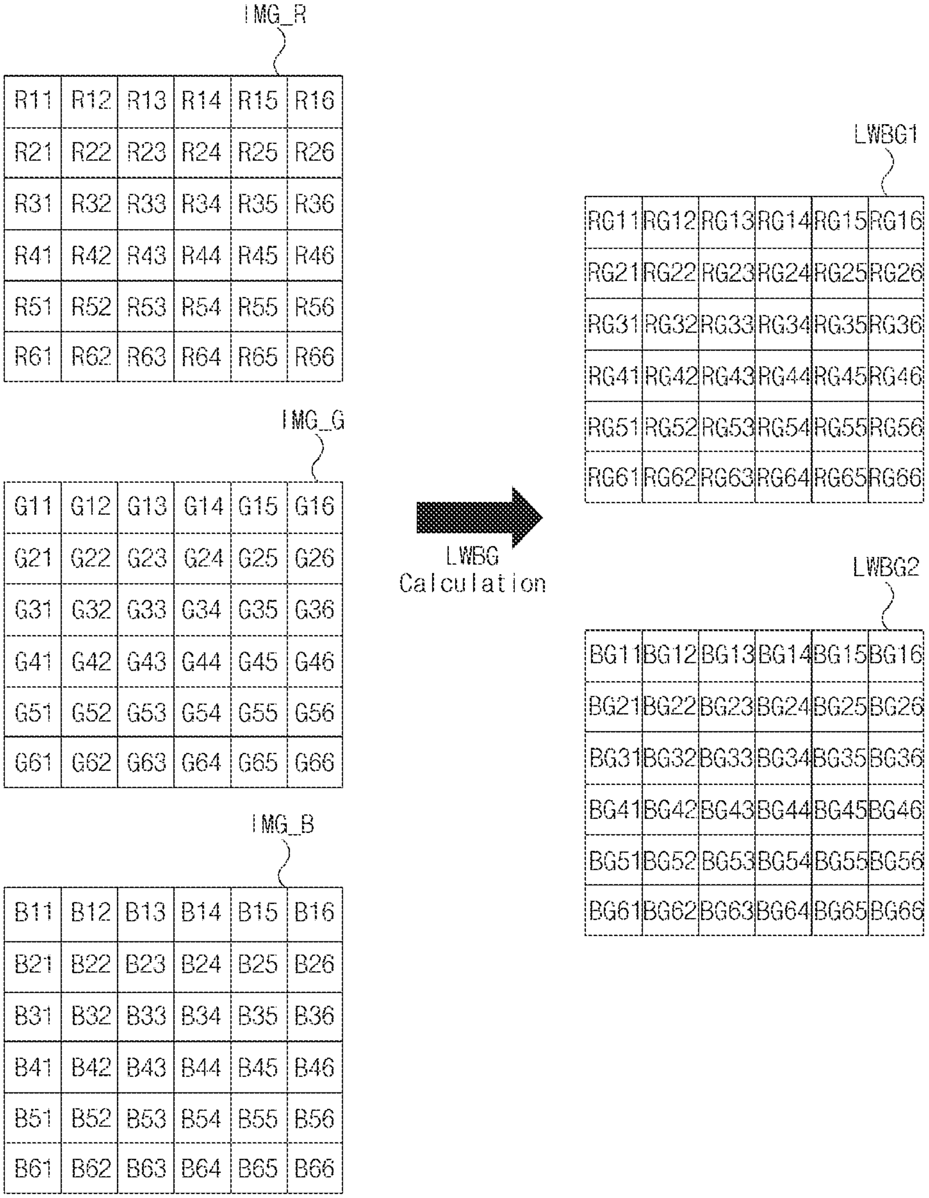
FIG. 4 is a schematic diagram illustrating an example of operation S20 shown in FIG. 2 based on some implementations of the disclosed technology.
Figure 5:
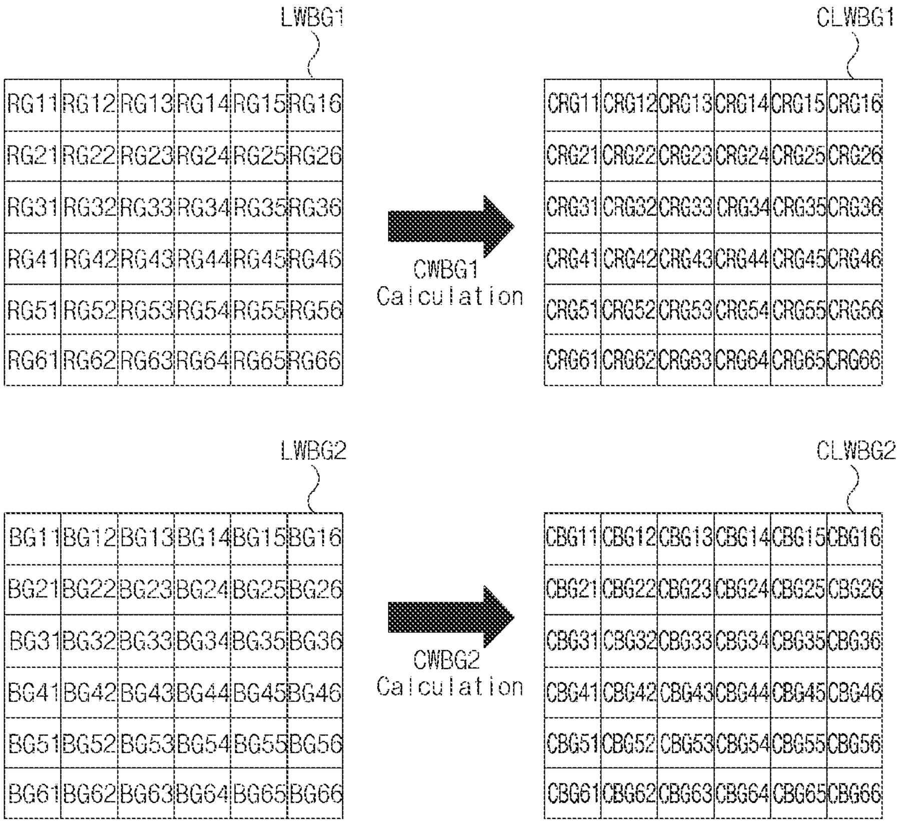
FIG. 5 is a schematic diagram illustrating an example of operation S30 shown in FIG. 2 based on some implementations of the disclosed technology.
Figure 6:
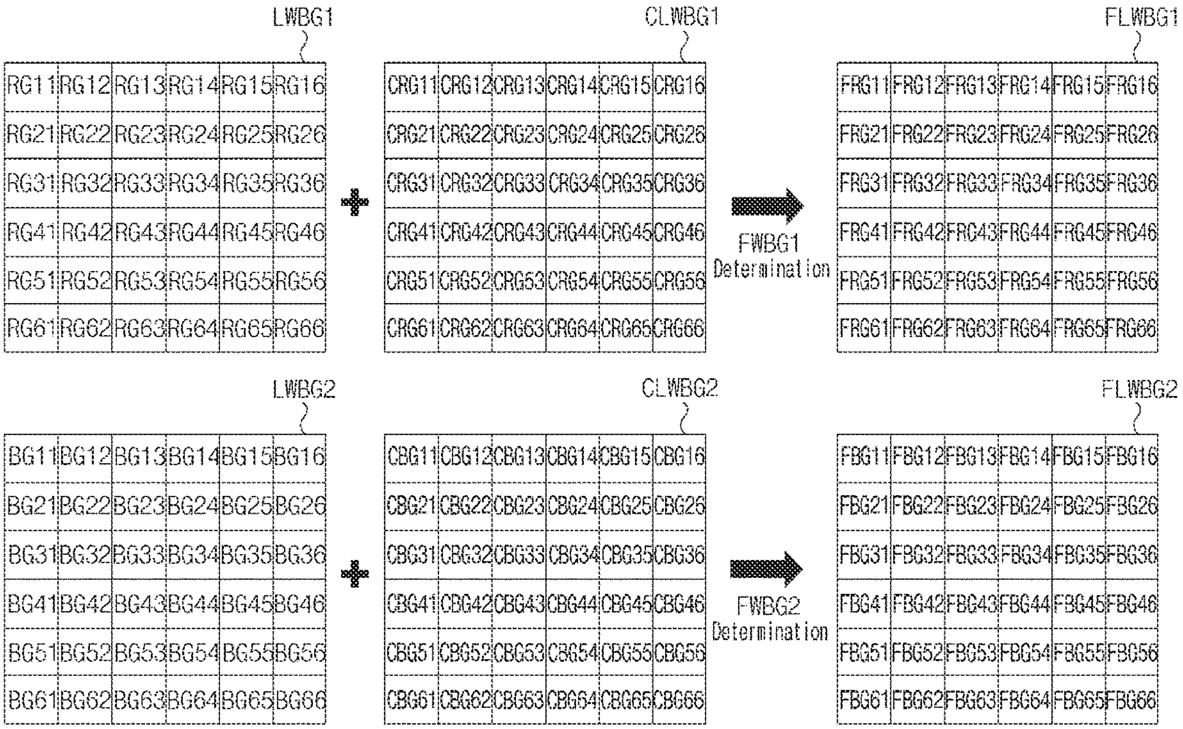
FIG. 6 is a schematic diagram illustrating an example of operation S100 shown in FIG. 2 based on some implementations of the disclosed technology.
Figure 7:
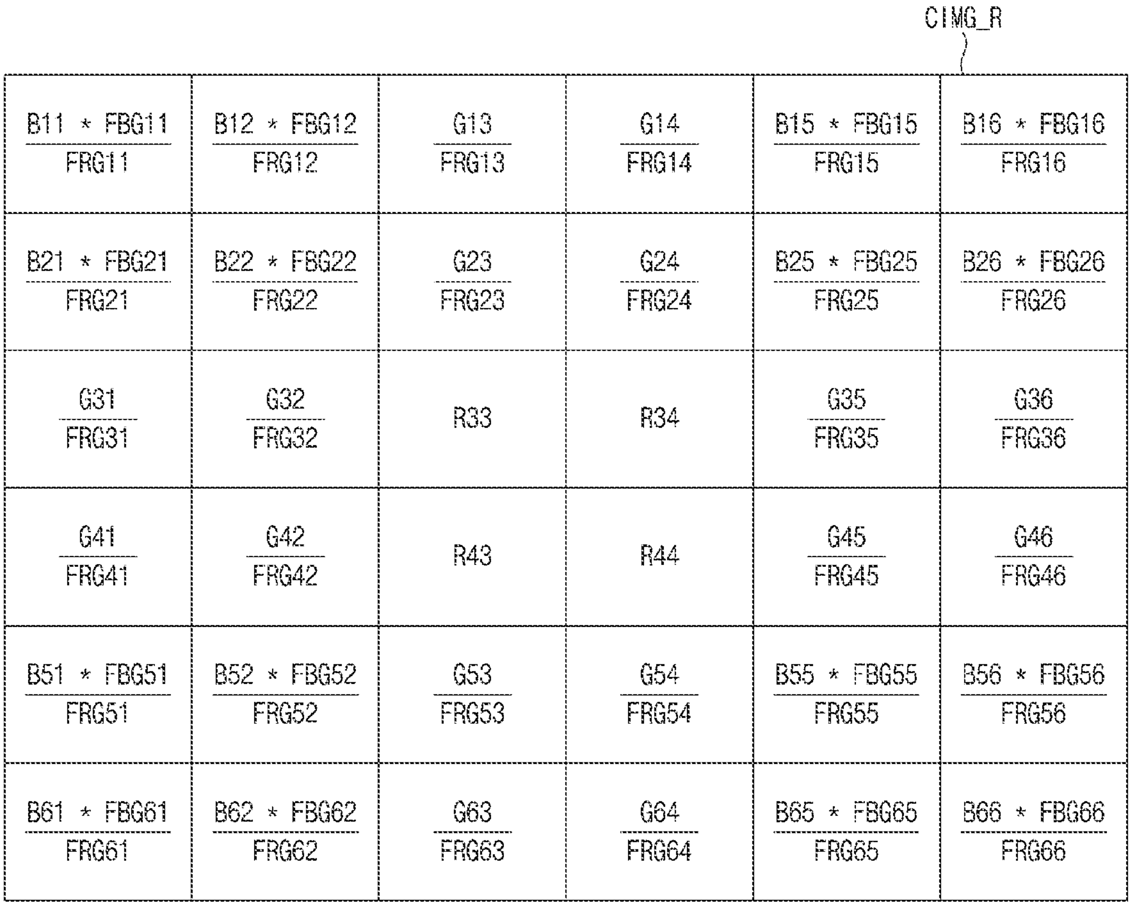
Figure 9:
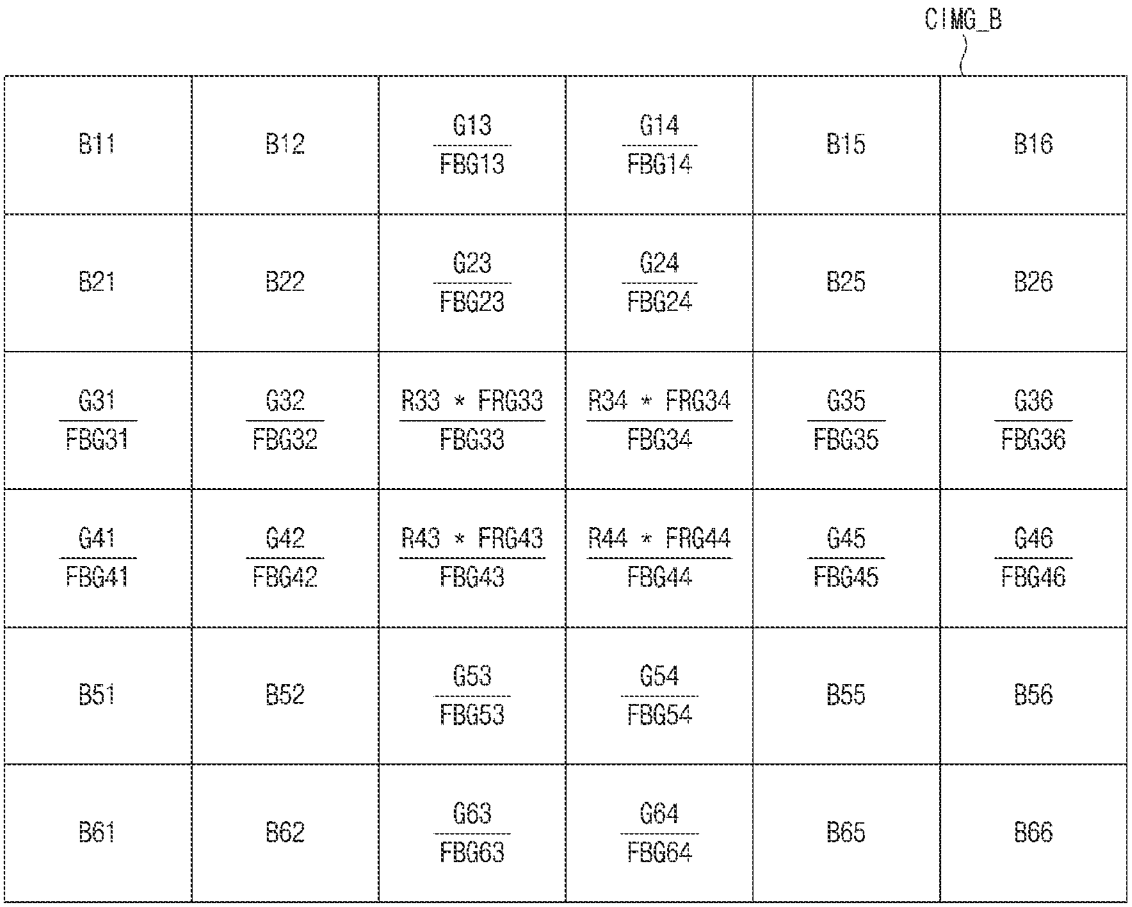

FIG. 2 is a flowchart illustrating an example of an image processing method based on some embodiments of the disclosed technology. FIG. 3 is a schematic diagram illustrating an example of operation S10 shown in FIG. 2 based on some embodiments of the disclosed technology. FIG. 4 is a schematic diagram illustrating an example of operation S20 shown in FIG. 2 based on some embodiments of the disclosed technology. FIG. 5 is a schematic diagram illustrating an example of operation S30 shown in FIG. 2 based on some embodiments of the disclosed technology. FIG. 6 is a schematic diagram illustrating an example of operation S100 shown in FIG. 2 based on some embodiments of the disclosed technology. FIGS. 7 to 9 are schematic diagrams illustrating examples of operation S80 shown in FIG. 2 based on some embodiments of the disclosed technology.

Referring to FIG. 2, the image processing method shown in FIG. 2 may be performed by the ISP 100 of FIG. 1.

The demosaicing unit 200 may generate RGB image data by interpolating the original image data (S10).

In FIG. 3, an example of original image data (IMG_O) is shown. In the following description, an image processing method for the original image data (IMG_O) is described by taking the original image data (IMG_O) of a quad-Bayer pattern arranged in a (6×6) matrix (including 6 rows and 6 columns) as an example. However, the pattern and size of the original image data (IMG_O) are not limited thereto, and the technical ideas described in the present disclosure may also be applied to arbitrarily modified patterns and sizes. The quad-Bayer pattern may refer to a pattern in which groups of pixels arranged in a (2×2) matrix corresponding to the same color are arranged in a Bayer pattern. In addition, although the original image data (IMG_O) of FIG. 3 is shown in a size of the (6×6) matrix for convenience of description, the original image data (IMG_O) corresponding to the (6×6) matrix in one image data (or one frame) obtained by capturing a scene may be repeatedly arranged in a horizontal direction (or a row direction) and/or a vertical direction (or a column direction).

In FIG. 3, an identification code for each pixel is denoted by Xij, where 'X' is the color (e.g., R, G or B), 'i' is the number of the row to which the pixel belongs, and 'J' is the number of the column to which the pixel belongs. For example, R34 may refer to red pixel data of a pixel that belongs to a third row and a fourth column.

The original image data (IMG_O) may include only pixel data for any one of red, green, and blue for each pixel, but the demosaicing unit 200 may generate red image data (IMG_R), green image data (IMG_G), and blue image data (IMG_B) by interpolating the original image data (IMG_O).

Referring back to FIG. 2, the LWBG calculator 310 may calculate a first LWBG representing a ratio between red pixel data and green pixel data for each pixel in RGB image data, and may calculate a second LWBG representing a ratio between blue pixel data and green pixel data for each pixel in RGB image data (S20).

In FIG. 4, the LWBG calculator 310 may calculate a first LWBG (LWBG1) representing a ratio between red pixel data and green pixel data from red image data (IMG_R), green image data (IMG_G), and blue image data (IMG_B), and may calculate a second LWBG (LWBG2) representing a ratio between blue pixel data and green pixel data from red image data (IMG_R), green image data (IMG_G), and blue image data (IMG_B).

For example, a red gain RG22 included in the first LWBG (LWBG1) may correspond to a value obtained by dividing green pixel data G22 of the green image data (IMG_G) by red pixel data R22 of the red image data (IMG_R). Likewise, other red gains included in the first LWBG (LWBG1) may be obtained by calculating green pixel data and red pixel data corresponding to each other.

For example, a blue gain BG43 included in the second LWBG (LWBG2) may correspond to a value obtained by dividing green pixel data G43 of the green image data (IMG_G) by blue pixel data B43 of the blue image data (IMG_B). Likewise, other blue gains included in the second LWBG (LWBG2) may be obtained by calculating green pixel data and blue pixel data corresponding to each other.

In the disclosed technology, the red gain may also be referred to as a first gain, and the blue gain may also be referred to as a second gain.

Referring back to FIGS. 2 and 5, the LWBG corrector 320 may perform filtering on each of the first LWBG (LWBG1) and the second LWBG (LWBG2) to calculate each of the first LWBG (LWBG1) and the second LWBG (LWBG2) (S30). Here, the term "filtering" may refer to a filter for reducing a degree of signal bouncing close to an impulse, and may be, for example, smoothing-filtering or median filtering. In the disclosed technology, smoothing-filtering is described, for example, in detail, but the type of such filtering is not limited thereto.

Smoothing filtering for the first LWBG may be performed according to Equation 1 below.

$$CRGij = \text{Mean}(RGij) + \alpha 1 * (RGij - \text{Mean}(RGij)) \quad \text{[Equation 1]}$$

In Equation 1, RGij may refer to red gains of pixels belonging to the i-th row and the j-th column, and CRGij may refer to corrected red gains of pixels belonging to the i-th row and the j-th column. Mean(RGij) may refer to an average of red gains belonging to a filtering kernel (e.g., an (11×11) kernel) centered on pixels belonging to the i-th row and the j-th column.

In addition, 'a1' may refer to a first correction coefficient, and may be calculated by Equation 2 below.

$$\alpha 1 = \frac{\text{Variance}(RGij)}{\text{Variance}(RGij) + \text{epsilon}} \quad \text{[Equation 2]}$$

In Equation 2, 'Variance(RGij)' may refer to a variance of red gains belonging to a filtering kernel (e.g., an (11×11) kernel) centered on pixels belonging to the i-th row and the j-th column. Also, 'epsilon' may refer to a constant that is configured to tune the first correction coefficient (a1).

Smoothing-filtering performance may increase as the size of the filtering kernel increases, but since resources required for such smoothing-filtering may increase, a suitable size may be experimentally determined in advance.

Smoothing-filtering for the first LWBG may be performed for each pixel, and a sudden bouncing red gain may be suppressed through smoothing-filtering for the first LWBG.

Smoothing-filtering for the second LWBG may be performed according to Equation 3 below.

$$CBGij = \text{Mean}(BGij) + \alpha 2 * (BGij - \text{Mean}(BGij)) \quad \text{[Equation 3]}$$

In Equation 3, BGij may refer to blue gains of pixels belonging to the i-th row and the j-th column, and CBGij may refer to corrected red gains of pixels belonging to the i-th row and the j-th column. Mean(BGij) may refer to an average of blue gains belonging to a filtering kernel (e.g., an (11×11) kernel) centered on pixels belonging to the i-th row and the j-th column.

In addition, 'a2' may refer to a second correction coefficient, and may be calculated by Equation 4 below.

$$\alpha 2 = \frac{\text{Variance}(BGij)}{\text{Variance}(BGij) + \text{epsilon}} \quad \text{[Equation 4]}$$

In Equation 4, 'Variance(BGij)' may refer to a variance of blue gains belonging to a filtering kernel (e.g., an (11×11) kernel) centered on pixels belonging to the i-th row and the j-th row. Also, 'epsilon' may refer to a constant that is configured to tune the second correction coefficient (a2), and may be a value that is the same as or different from 'epsilon' of Equation 2.

Smoothing-filtering of the second LWBG may be performed for each pixel, and may suppress a sudden bouncing blue gain through smoothing-filtering of the second LWBG.

Operation S100 shown in FIG. 2 may be used to select a gain suitable for a target pixel from among LWBG and CLWBG (corrected local white balance gain) for each pixel, and may include operations S40 to S70.

In some other implementations, operation S100 may be omitted. In this case, LWBG may be selected as a final gain for all pixels.

The gain selector 330 may determine a final gain by comparing a difference (i.e., an absolute value of a subtraction result) between a global white balance gain (GWBG) and a local white balance gain (LWBG) with a difference between the GWBG and the CLWBG (S40).

The GWBG may include a first GWBG (or a first global gain) for red pixels and a second GWBG (or a second global gain) for blue pixels. The first GWBG may refer to a value obtained by dividing the average of green pixel data by the average of red pixel data in the entire frame, and the second GWBG may refer to a value obtained by dividing the average of green pixel data by the average of blue pixel data in the entire frame.

GWBG may be calculated by the gain selector 330, but may also be provided from another component that performs white balance adjustment in the ISP 100.

If the difference between GWBG and LWBG is greater than the difference between GWBG and CLWBG (Yes in S40), operation S50 to be described below may be performed.

If the difference between GWBG and LWBG is less than or equal to the difference between GWBG and CLWBG (No in S40), the gain selector 330 may determine the LWBG to be the final gain (S70).

Operation S40 may be performed for each of the first GWBG and the second GWBG for each pixel.

Referring to FIG. 6, for example, the gain selector 330 may determine a red gain RG42 or a correction red gain CRG42 to be a final red gain for a target pixel according to a result of comparing a difference between a red gain RG42 of the first LWBG (LWBG1) and the first GWBG with a difference between the corrected red gain CRG42 of the first CLWBG (CLWBG1) and the first GWBG.

In addition, the gain selector 330 may determine a blue gain BG42 or a correction blue gain CBG42 to be a final blue gain for a target pixel according to a result of comparing a difference between a blue gain BG42 of the second LWBG (LWBG2) and the second GWBG with a difference between the corrected blue gain CBG42 of the second CLWBG (CLWBG2) and the second GWBG.

The image processing method based on some embodiments of the disclosed technology may prevent a red gain or a blue gain from bouncing more abruptly than a red gain or a blue gain of the entire frame when an error occurs in interpolation of a spot-shaped bright object due to limitations of the interpolation algorithm. Therefore, in operation S40, a gain having a smaller difference from GWBG among LWBG and CLWBG can be selected as the final gain.

If the difference between GWBG and LWBG is greater than the difference between GWBG and CLWBG (Yes in S40), the gain selector 330 may compare luminance (brightness) of the target pixel with luminance (brightness) of neighboring pixels adjacent to the target pixel (S60).

Here, the luminance (brightness) of the target pixel may be obtained by converting the original image data (IMG_O) into pixel data of the same color as the target pixel in a certain region (e.g., a region of a (4×4) matrix) including the target pixel.

For example, the luminance (LU_T) of a target pixel corresponding to R33 in the original image data (IMG_O) of FIG. 3 may be calculated by Equation 5 below.

$$LU\_T = (5 * GWBG1 * (R33 + R34 + R43 + R44)/4 + 9 * (G23 + G24 + G32 + G35 + G42 + G45 + G53 + G54)/8 + 2 * GWBG2 * (B22 + B25 + B52 + B55)/4)/16 \quad \text{[Equation 5]}$$

In Equation 5, GWBG1 may be a first GWBG, and GWBG2 may be a second GWBG. In more detail, 5 may be a weight for converting a red component into a yellow component, 9 may be a weight for converting a green component into a yellow component, and 2 may be a weight for converting a blue component into a yellow component.

In addition, luminance (brightness) of neighboring pixels may correspond to an average value of luminance calculated through an operation corresponding to Equation 5 with respect to the neighboring pixels (for example, pixels corresponding to G31, G13, G35, and G53) spaced apart from the target pixel by a predetermined distance (for example, a distance corresponding to two pixels arranged in an upper direction, a lower direction, a left direction, or a right direction).

If a predetermined condition in which luminance of the target pixel is greater than luminance of the neighboring pixels by a predetermined threshold or more is satisfied (Yes in S60), the gain selector 330 may determine LWBG to be the final gain (S50). Here, the predetermined condition may be a condition in which luminance of the target pixel is absolutely greater than a predetermined first threshold and relatively greater than the luminance of the neighboring pixels by a predetermined second threshold or more. The first threshold and the second threshold may be arbitrary values determined experimentally.

If the luminance of the target pixel is less than or equal to the luminance of the neighboring pixels or the luminance level of the target pixel does not satisfy a predetermined condition (No in S60), the gain selector 330 may determine the CLWBG to be the final gain (S70).

The image processing method based on some embodiments of the disclosed technology may prevent a red gain or a blue gain from bouncing more abruptly than a red gain or a blue gain of the entire frame when an error occurs in interpolation of a spot-shaped bright object due to limitations of the interpolation algorithm. Therefore, in operation S60, the filtered LWBG may be selected as the final gain for a target pixel with a high probability of having a spot-shaped bright object because the luminance of the target pixel is greater than the luminance of the neighboring pixels, and the LWBG before filtering may be selected as the final gain for a target pixel with a low probability of having a spot-shaped bright object.

The final gains FLWBG1 and FLWBG2 shown in FIG. 7 may be determined in operations S50 and S70, the first final gain FLWBG1 may include the final red gain (e.g., FRG11) for each pixel, and the second final gain FLWBG2 may include the final blue gain (e.g., FBG11) for each pixel.

Although FIG. 2 shows that operation S40 and operation S60 can be performed sequentially for convenience of description, other implementations are also possible, and it should be noted that, according to another embodiment, operation S40 or operation S60 may be omitted, or the order of performing operations S40 and S60 may be reversed as needed.

The demosaicing corrector 340 may correct RGB image data (IMG_R, IMG_G, IMG_B) by applying the final gains (FLWBG1, FLWBG2) determined for each pixel to the original image data (IMG_O) (S80).

FIG. 7 illustrates an example of corrected red image data (CIMG_R) that is obtained by correcting red image data (IMG_R) by applying the final gains (FLWBG1, FLWBG2) determined for each pixel to the original image data (IMG_O).

Specifically, for the original image data (IMG_O), the demosaicing corrector 340 may apply a gain of '1' to red pixel data (e.g., R33), may apply a gain denoted by '1/final red gain' (e.g., 1/FRG13) to green pixel data (e.g., G13), and may apply a gain denoted by 'final blue gain (e.g., FBG11)/final red gain (e.g., FRG11)' to blue pixel data (e.g., B13), thereby generating corrected red image data (CIMG_R).

FIG. 8 illustrates an example of corrected green image data (CIMG_G) that is obtained by correcting green image data (IMG_G) by applying the final gains (FLWBG1, FLWBG2) determined for each pixel to the original image data (IMG_O).

Specifically, for the original image data (IMG_O), the demosaicing corrector 340 may apply the final red gain (e.g., FRG33) to red pixel data (e.g., R33), may apply a gain of '1' to green pixel data (e.g., G13), and may apply a gain of the final blue gain (e.g., FBG11) to blue pixel data (e.g., B11), thereby generating corrected green image data (CIMG_G).

FIG. 9 illustrates an example of corrected blue image data (CIMG_B) that is obtained by correcting blue image data (IMG_B) by applying the final gains (FLWBG1, FLWBG2) determined for each pixel to the original image data (IMG_O).

Specifically, for the original image data (IMG_O), the demosaicing corrector 340 may apply a gain denoted by 'final red gain (e.g., FRG33)/final blue gain (e.g., FBG11)' to red pixel data (e.g., R33), may apply a gain denoted by '1/final blue gain' (e.g., 1/FBG13) to green pixel data (e.g., G13), and may apply a gain of '1' to blue pixel data (e.g., B11), thereby generating corrected blue image data (CIMG_B).

If it is assumed that a spot-shaped bright object exists in the four central pixels (e.g., pixels corresponding to R33, R34, R43, and R44) located at the center of the original image data (IMG_O), red pixel data (R33, R34, R43, R44) may have relatively very high values, but other pixel data (e.g., B11, G13, etc.) except for the red pixel data (R33, R34, R43, R44) may have relatively very low values.

The demosaicing unit 200 may obtain green pixel data of the central pixels by performing linear interpolation based on data of green pixels (e.g., G13, etc.) disposed around the central pixels, and may obtain blue pixel data of the central pixels by performing linear interpolation based on data of blue pixels (e.g., B11, etc.) disposed around the central pixels. As a result, red gains (RG33, RG34, RG43, RG44) for the central pixels may have significantly lower values than red gains (e.g., RG11) for other neighboring pixels.

The LWBG corrector 320 may provide corrected red gains (CRG33, CRG34, CRG43, CRG44) corrected in a manner that the red gains (RG33, RG34, RG43, RG44) for the central pixels do not change more abruptly than the red gains (e.g., RG11) for other neighboring pixels through smoothing-filtering.

The demosaicing corrector 340, in an embodiment, may generate green pixel data and blue pixel data using corrected red gains (CRG33, CRG34, CRG43, CRG44), such that the demosaicing corrector 340 can reduce noise caused by false colors.

However, in an embodiment, the gain selector 330 may use the corrected gain to which smoothing-filtering is applied only when there is a possibility that a spot-shaped bright object exists in the target pixel, such that it is possible to prevent deterioration of the quality of images while reducing noise.

As is apparent from the above description, the image signal processor based on some embodiments of the disclosed technology may reduce demosaicing errors for an image including a locally bright object.

The embodiments of the disclosed technology may provide a variety of effects capable of being directly or indirectly recognized through the above-mentioned patent document.

Although a number of illustrative embodiments have been described, it should be understood that modifications and enhancements to the disclosed embodiments and other embodiments can be devised based on what is described and/or illustrated in this patent document.

What is claimed is:

1. An image signal processor comprising:

a local white balance gain (LWBG) calculator configured to calculate a first gain representing a ratio between red pixel data and green pixel data and a second gain representing a ratio between blue pixel data and green pixel data;

a local white balance gain (LWBG) corrector configured to generate a first correction gain and a second correction gain by filtering each of the first gain and the second gain; and a gain selector configured to select any one of the first gain or the first correction gain as a first final gain, select any one of the second gain or the second correction gain as a second final gain, and provide the selected gains to the demosaicing corrector;

a demosaicing corrector configured to correct each of the red pixel data, the green pixel data, and the blue pixel data using the first final gain and the second final gain.

2. The image signal processor according to claim 1, further comprising:

a demosaicing unit configured to generate the red pixel data, the green pixel data, and the blue pixel data by interpolating original image data corresponding to a predetermined color pattern.

3. The image signal processor according to claim 2, wherein:

the color pattern is a Bayer pattern, a quad-Bayer pattern, or a nona-Bayer pattern.

4. The image signal processor according to claim 2, wherein:

the first gain and the second gain are calculated for the same target pixel.

5. The image signal processor according to claim 1, wherein the LWBG corrector is configured to:

perform smoothing-filtering on the first gain using an average and variance of first gains of pixels included in a filtering kernel; and perform smoothing-filtering on the second gain using an average and variance of second gains of pixels included in the filtering kernel.

6. The image signal processor according to claim 1, wherein the LWBG corrector is configured to:

perform median filtering on each of the first gain and the second gain.

7. The image signal processor according to claim 1, wherein:

the gain selector is configured to determine any one of the first gain or the first correction gain to be the first final gain according to a result of comparing a difference between the first gain and a first global gain that represents a ratio of an average of red pixel data to an average of green pixel data in an entire frame with a difference between the first global gain and the first correction gain.

8. The image signal processor according to claim 7, wherein:

the gain selector is configured to determine the first gain to be the first final gain when the difference between the first global gain and the first gain is less than or equal to the difference between the first global gain and the first correction gain.

9. The image signal processor according to claim 1, wherein:

the gain selector is configured to determine any one of the second gain or the second correction gain to be the second final gain according to a result of comparing a difference between the second gain and a second global gain that represents a ratio of an average of blue pixel data to an average of green pixel data in an entire frame with a difference between the second global gain and the second correction gain.

10. The image signal processor according to claim 9, wherein:

the gain selector is configured to determine the second gain to be the second final gain when the difference between the second global gain and the second gain is less than or equal to the difference between the second global gain and the second correction gain.

11. The image signal processor according to claim 1, wherein the gain selector is configured to:

select the first final gain and the second final gain according to a result of comparing luminance of a target pixel corresponding to the first gain and the second gain with luminance of at least one neighboring pixel adjacent to the target pixel.

12. The image signal processor according to claim 11, wherein:

the luminance of the target pixel is obtained by converting original image data into pixel data of the same color as the target pixel in a region including the target pixel.

13. The image signal processor according to claim 11, wherein:

when a predetermined condition in which the luminance of the target pixel is greater than the luminance of the neighboring pixel by a predetermined threshold or more is satisfied, the gain selector determines the first correction gain to be the first final gain and determines the second correction gain to be the second final gain.

14. The image signal processor according to claim 13, wherein:

the predetermined condition is a condition in which the luminance of the target pixel is greater than a first predetermined threshold and greater than the luminance of the neighboring pixel by a predetermined second threshold or more.

15. An image signal processing method comprising:

calculating a first gain representing a ratio between red pixel data and green pixel data and a second gain representing a ratio between blue pixel data and green pixel data;

generating a first correction gain and a second correction gain by filtering each of the first gain and the second gain; and selecting any one of the first gain or the first correction gain as a first final gain;

selecting any one of the second gain or the second correction gain as a second final gain;

correcting each of the red pixel data, the green pixel data, and the blue pixel data using the first final gain and the second final gain.

* * * * *